United States Patent
Jacquemont

(10) Patent No.: US 9,482,495 B2
(45) Date of Patent: Nov. 1, 2016

(54) ARMOURED VEHICLE BODY SHELL WITH SMALLER STRUTS

(71) Applicant: NEXTER SYSTEMS, Roanne (FR)

(72) Inventor: Jacky Jacquemont, Bourges (FR)

(73) Assignee: NEXTER SYSTEMS, Roanne (FR)

( * ) Notice: Subject to any disclaimer, the term of this patent is extended or adjusted under 35 U.S.C. 154(b) by 0 days.

(21) Appl. No.: 14/760,797

(22) PCT Filed: Jan. 14, 2014

(86) PCT No.: PCT/FR2014/050069
§ 371 (c)(1),
(2) Date: Jul. 14, 2015

(87) PCT Pub. No.: WO2014/111652
PCT Pub. Date: Jul. 24, 2014

(65) Prior Publication Data
US 2015/0354927 A1    Dec. 10, 2015

(30) Foreign Application Priority Data

Jan. 15, 2013  (FR) ..................................... 13 00147

(51) Int. Cl.
| | | |
|---|---|---|
| *F41H 7/04* | (2006.01) | |
| *B62D 25/04* | (2006.01) | |
| *B62D 33/06* | (2006.01) | |

(Continued)

(52) U.S. Cl.
CPC ............... *F41H 7/044* (2013.01); *B62D 25/04* (2013.01); *B62D 33/06* (2013.01); *F41H 5/226* (2013.01); *F41H 5/263* (2013.01); *F41H 7/02* (2013.01)

(58) Field of Classification Search
CPC ............ F41H 5/20; F41H 5/22; F41H 5/226; F41H 5/263; F41H 7/044; F41H 7/04; F41H 7/042
USPC ............... 89/36.08, 930, 931, 935, 936, 937
See application file for complete search history.

(56) References Cited

U.S. PATENT DOCUMENTS

| | | | |
|---|---|---|---|
| 1,854,210 A | 4/1932 | Mercer | |
| 2,061,788 A | 11/1936 | Wright | |

(Continued)

FOREIGN PATENT DOCUMENTS

| | | | |
|---|---|---|---|
| DE | 19945589 | * | 3/2001 |
| EP | 2258917 A2 | | 12/2010 |

OTHER PUBLICATIONS

May 16, 2014 Search Report issued in International Patent Application No. PCT/FR2014/050069.

(Continued)

*Primary Examiner* — Stephen M Johnson
(74) *Attorney, Agent, or Firm* — Oliff PLC

(57) ABSTRACT

A body shell of an armored vehicle includes a front face carrying a bulletproof windscreen projecting towards an outside of the body shell, at least one side wall including an opening, the side wall being integral with the front face at a strut that is defined by a part of the side wall included between an edge of the opening and a rim of the side wall situated furthest outwards at the front of the vehicle. In the armored vehicle body shell, the strut extends beyond the front face towards the outside of the body shell, and the edge of the opening is situated near the front face so that a junction between the strut and the front face of the body shell is at the vicinity of the edge of the opening which forms a rear edge of the strut.

6 Claims, 5 Drawing Sheets

(51) Int. Cl.
*F41H 5/22* (2006.01)
*F41H 5/26* (2006.01)
*F41H 7/02* (2006.01)

(56) References Cited

U.S. PATENT DOCUMENTS 3,586,236 A * 6/1971 Schaffler ............... A62C 27/00
                                                      169/48
4,351,558 A     9/1982 Mueller 7,712,409 B2 * 5/2010 Cunningham .......... F41H 7/044
                                                   89/36.09
2011/0303817 A1 * 12/2011 Adams ................... F41H 5/013
                                                    248/560

OTHER PUBLICATIONS

May 16, 2014 International Written Opinion issued in International Patent Application No. PCT/FR2014/050069.

* cited by examiner

ARMOURED VEHICLE BODY SHELL WITH SMALLER STRUTS

BACKGROUND

The technical field of the invention is that of body shell structures of armoured vehicles and the leaves thereof.

Conventionally, the known armoured vehicles, such as that disclosed in WO201122295 or that represented in FIG. 1, comprise glazing 10 (on the side walls) and 11 (windscreen) which must have a large thickness (between 40 and 100 mm) in order to withstand attacks of kinematic projectiles.

Considering the thickness of the glazing 10 and 11 and the weight thereof, they require fixing frames 9 allowing to robustly make the glazing 10 and 11 integral with the walls of the body shell of the vehicle 100.

Each frame 9 comprises a support surface 9a, surrounding the frame of the glazing 10 or 11 and substantially parallel to the plane of the glazing 10 or 11. This support surface 9a is necessary and serves as an area for fixing the frame 9 equipped with the glazing 10 or 11 with the body shell of the vehicle 100. Thus, if considering a vehicle windscreen 11, the entire front face of the vehicle cannot be occupied by the glazing 11, because space must be provided to receive the support surface 9a, thereby reducing the field of view of an occupant 1 within the vehicle. The problem is similar for glazing 10 which are on the side walls 20 of the body shell.

In FIG. 1, each side wall 20 comprises an opening 21 which is here intended to be closed by a door 30 hinged on the wall 20 at a vertical hinge 24 which is attached to the side wall 20. The door 30 comprises a glazed surface 10 integral with a frame 9. In the following description, will be designated by strut 20a a part of the side wall 20 of the body shell which is situated between an edge 22 of the opening 21 of the side wall 20 and a rim 23 of this wall 20 which is integral with the front face 40 of the body shell and forms a ridge of the body shell. Thus, at the struts 20a, as illustrated in FIG. 1, an occupant 1 of the vehicle will have his external field of view reduced by an angle M (both on the left and right sides) by the masks formed by the strut 20a of the side wall 20 and the frames 9 of the windscreen 11 and the glazed surface 10. In the case where the side wall does not comprise a door, but only a glazed opening 21, the strut 20a is always the part of the side wall 20 of the body shell situated between the edge 22 of the opening 21 and the rim 23 of the wall 20 integral with the front face 40 of the body shell.

SUMMARY

A simple reduction of the width of the struts would cause a reduction of the mechanical strength of the struts, thus of the protection of the vehicle. In addition, a simple reduction of the struts would not necessarily allow to have enough space to receive the support surfaces of the struts 9a.

U.S. Pat. No. 2,061,788 discloses a civilian motor vehicle comprising windscreen struts profiled for improving the field of view of the occupants. Each strut enters into the cab interior and extends to a rear end which also forms the edge of the opening closed by the door. Thus situated the junction between the struts and the front face is at a distance from the edge of the opening. However, such assembly does not allow to optimally withstand the effects of lateral explosions.

The aim of the invention is to improve the field of view of the occupant of the vehicle by reducing the masking angle M due to the strut 20a without reducing the ballistic protection performance of the vehicle (in particular with respect to the blast effects of explosive devices).

An advantage of the invention is to improve the ballistic support of a side wall of the body shell in case of blast of a lateral explosion.

Another advantage of the invention is to improve the accessibility to the vehicle.

Thus, the invention relates to a body shell of an armoured vehicle comprising:

a front face carrying a bulletproof windscreen projecting towards the outside of the body shell, at least one side wall comprising an opening, said side wall being integral with the front face at a strut which is defined by a part of the side wall comprised between an edge of the opening and a rim of the side wall situated furthest outwards at the front of the vehicle, the armoured vehicle body shell being characterized in that:

the strut extends beyond the front face towards the outside of the body shell, at least one edge of the opening is situated near the front face, so that the junction between the strut and the front face of the vehicle is at the vicinity of the edge of the opening which forms a rear edge of the strut.

Advantageously, the opening is intended to be closed by a glazed leaf.

Advantageously, the opening is intended to be closed by a glazing.

According to a feature of the invention, the glazed leaf comprises a door covering the opening of the side wall, said door comprising a glazed part at least one of the edges of which is situated at the vicinity of the edge of the opening situated near the front face.

According to another feature of the invention, the strut extends towards the outside of the body shell with a width L at least equal to the thickness of the windscreen.

BRIEF DESCRIPTION OF THE DRAWINGS

The invention will become more apparent upon reading the following description, description illustrated with the appended drawings, in which.

DETAILED DESCRIPTION OF EMBODIMENTS

Figure 2:
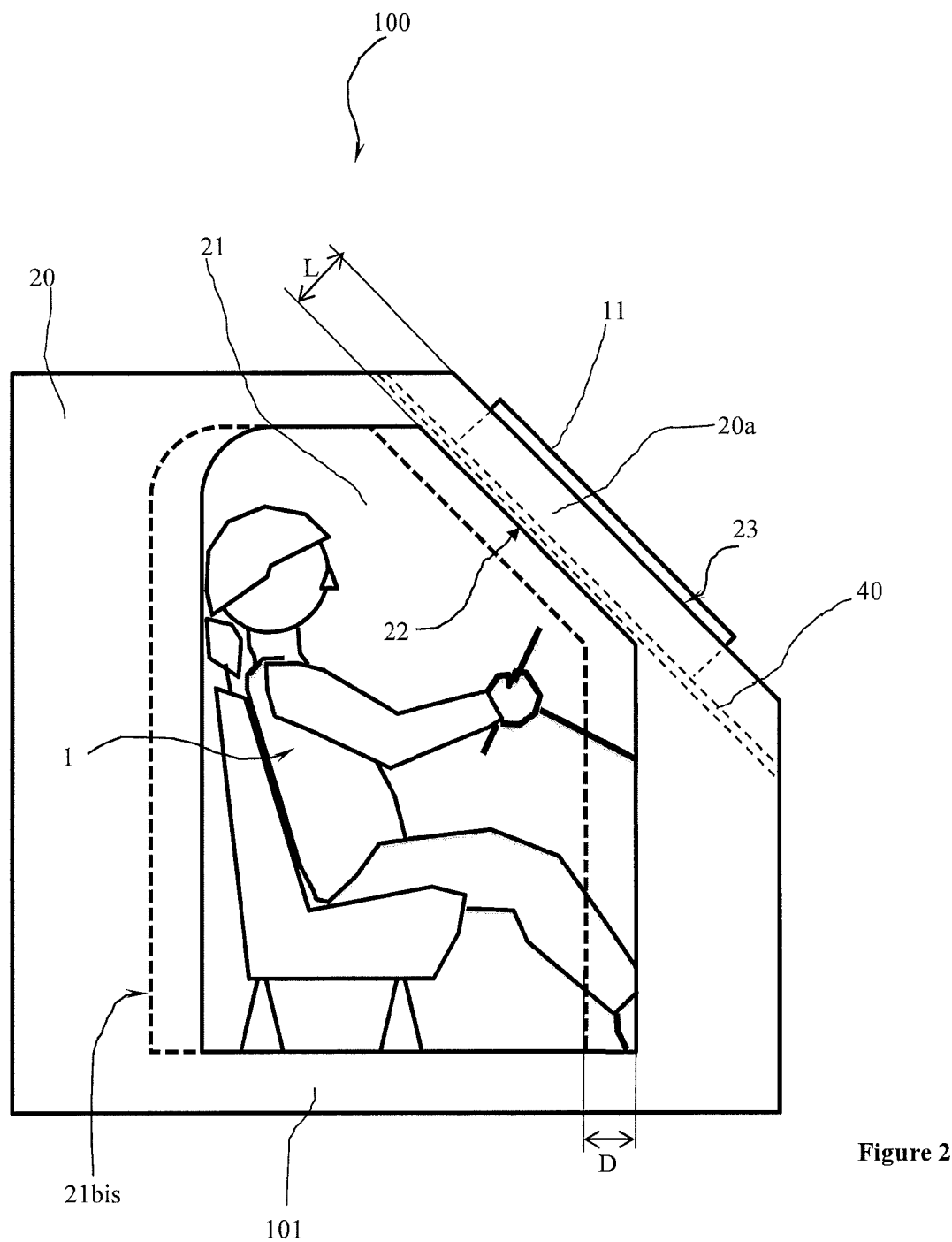
FIG. 2 shows a diagram of a side view of a vehicle according to the invention, without side door or glazing.
Figure 4:
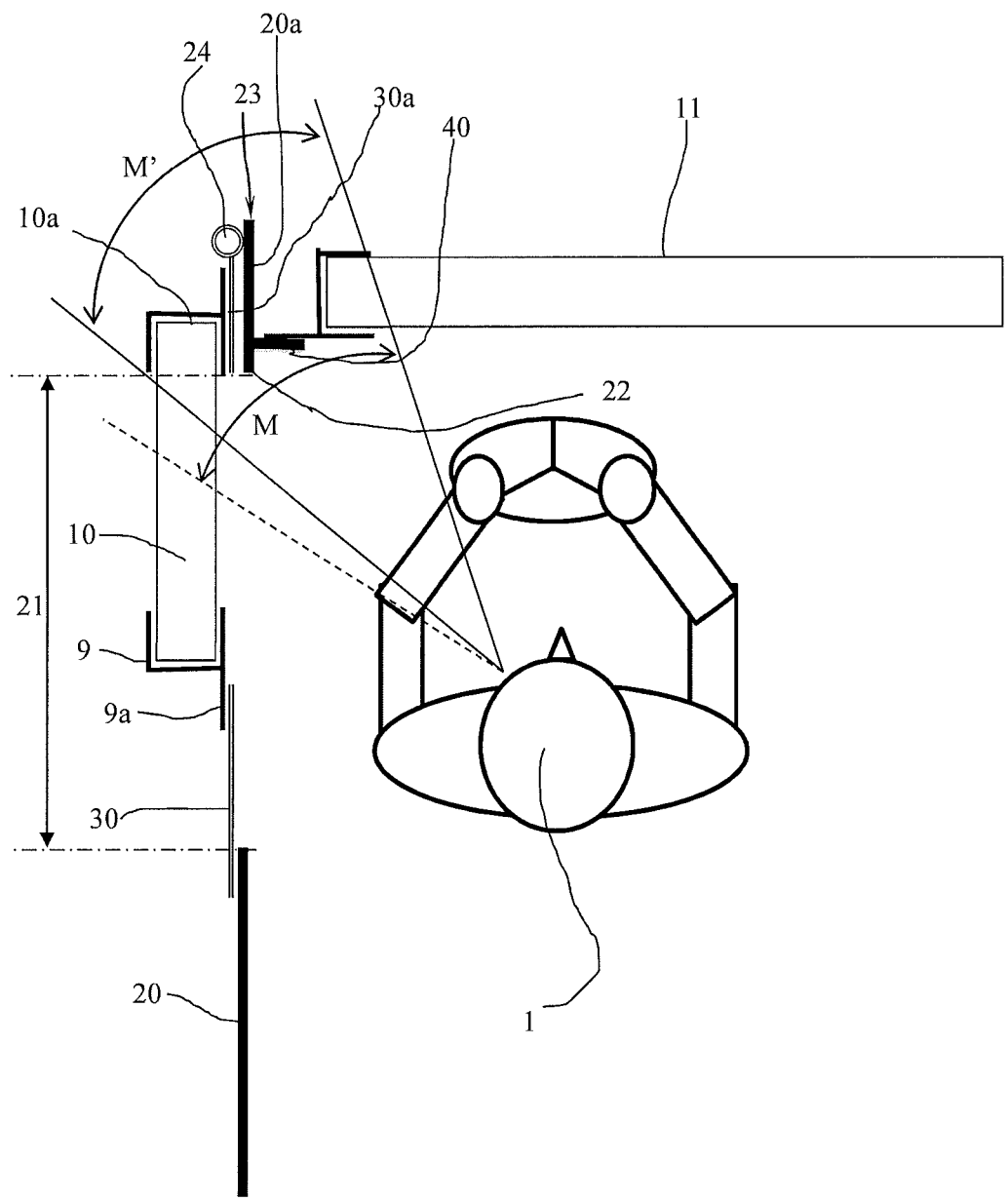
FIG. 4 shows a partial diagram of a top view of a vehicle according to the invention.

According to FIG. 2 and to the invention, an armoured vehicle 100 comprises a body shell 101. The front face 40 of the body shell 101 comprises a thick bulletproof windscreen 11. Side walls 20, also visible in FIG. 4, are situated on either side of the front face 40. The side wall 20 comprises an opening 21 for allowing an occupant 1 to access to the interior of the vehicle 100. The wall 20 is made integral with the front face 40 (for example, by welding). The part of the side wall 20 situated between an edge 22 of the opening 21 and a front rim 23 of the side wall 20 situated furthest at the front of the body, define a strut 20a of the wall 20.

It can be noted that the strut 20*a* extends beyond the front face 40 towards the front of the body, and thus at least partially covers the thickness of the windscreen 11.

Figure 1:
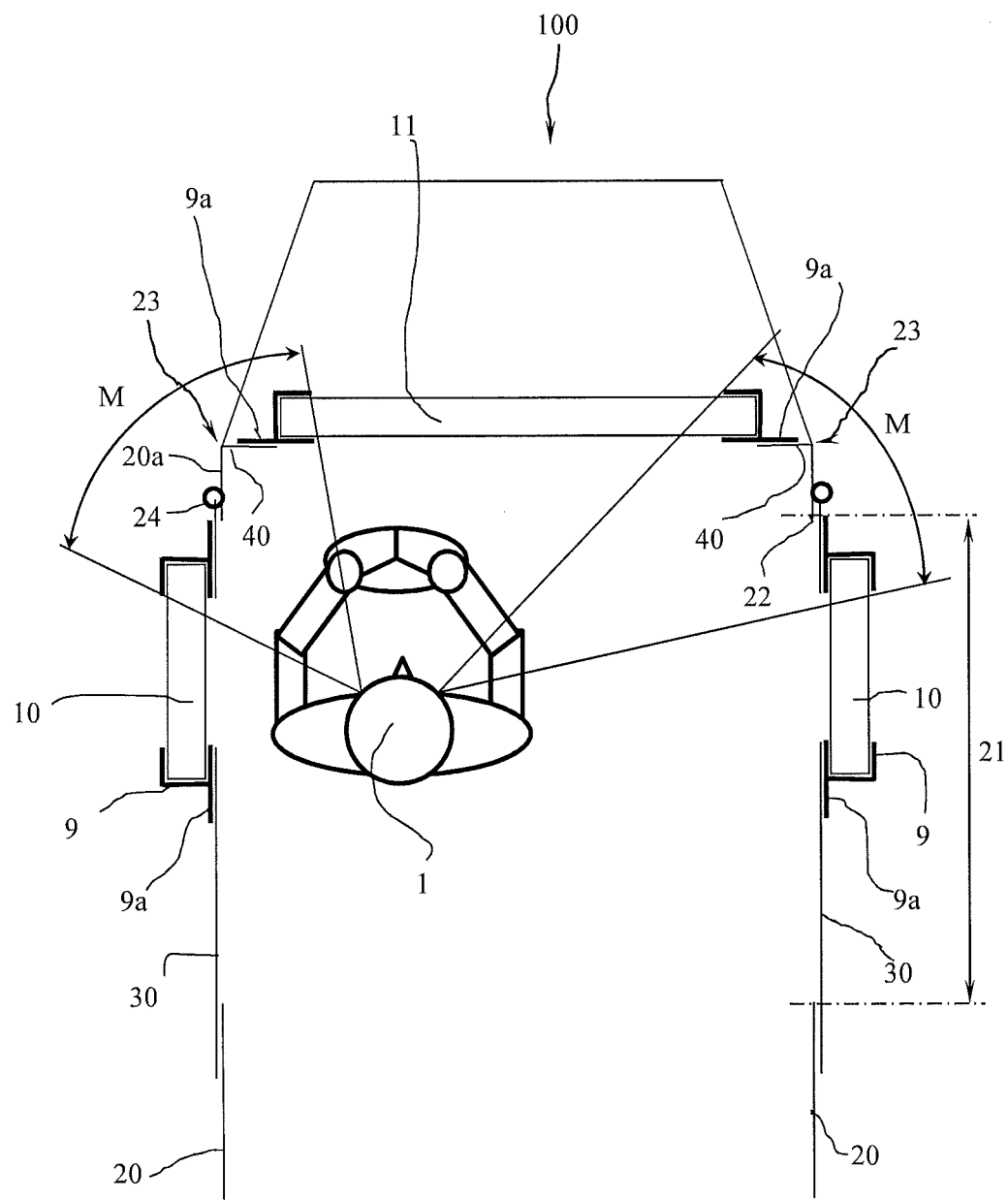
FIG. 1 shows a diagram of a top view of a vehicle according to the prior art.

With respect to the prior art shown in FIG. 1, this forward position of the strut 20*a* allows to move forward the opening 21 by a distance D of about 80 mm by placing the front face 40 at no more than 40 mm from the edge 22 of the opening 21. The position of an opening according to the prior art has been represented in FIG. 2 by dotted lines 21*bis*. The person skilled in the art could easily take benefit of the forward position of the opening 21 to increase the size of the opening 21, thereby allowing an easier access to the interior of the vehicle.

Figure 3:
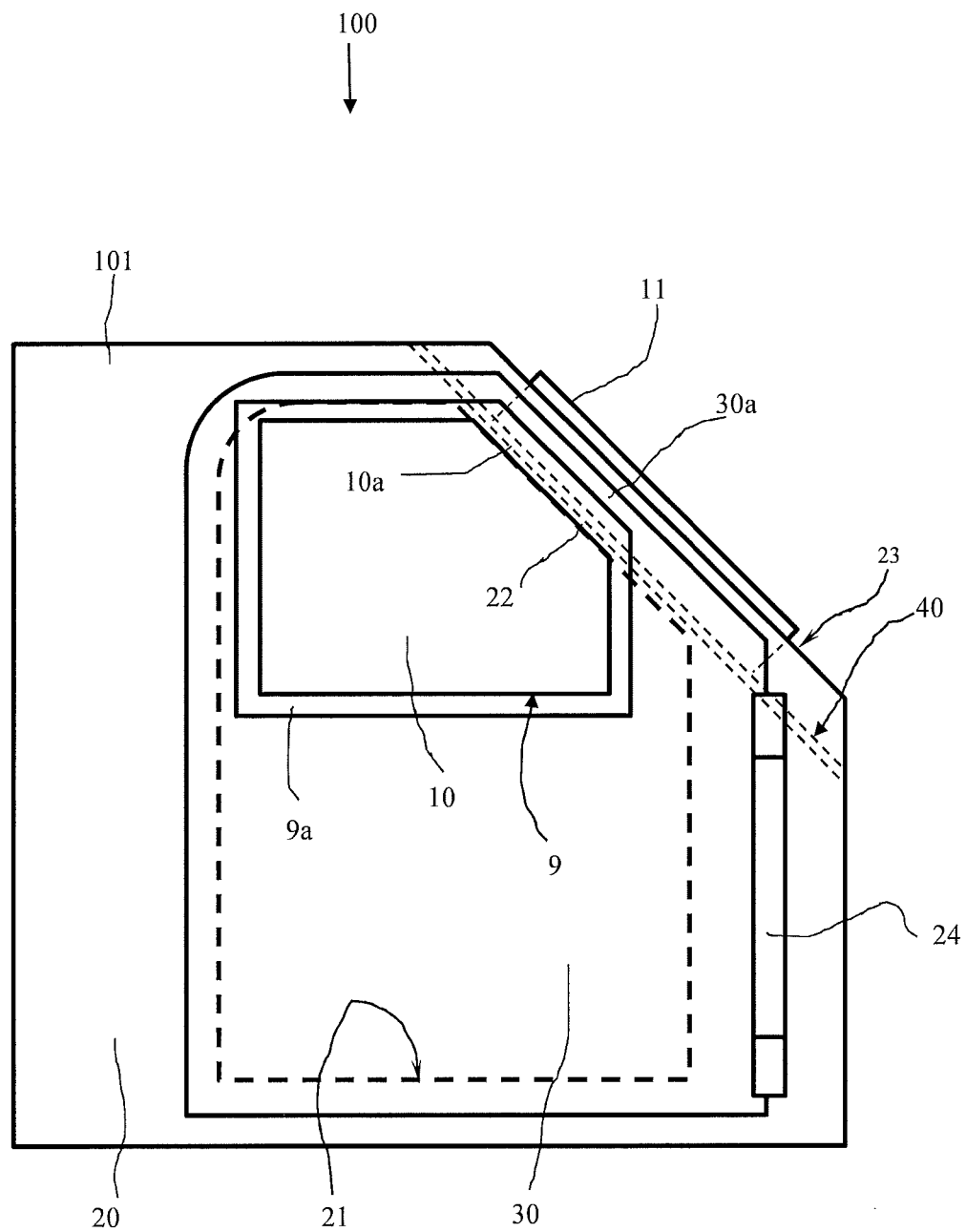
FIG. 3 shows a diagram of a side view of a vehicle according to the invention, with a door and a glazing.

The opening 21 closed by a door 30 is represented in FIG. 3 as a door 30 for pivoting with respect to the side wall 20 around a hinge 24 of vertical axis. The door 30 bears, by the circumference of the inner face thereof, against the side wall 20. This support is required to ensure a good resistance of the door to potential explosion blasts on the sides of the vehicle. Thus, the front upper part 30*a* of the inner face of the door 30 bears against the strut 20*a*. For the same reasons of support, the assembly of the strut 20*a* with the front face 40 is made by pressing a face of the strut against the side edge of the front face 40 (edge visible in dotted lines in the figure).

The door 30 comprises a glazing 10 integral with the door 30 by a frame 9 pressing the glazing 10 on the door 30 by means of a support surface 9*a*.

It can be noted, in FIGS. 3 and 4, that the edge 10*a* of the glazing 10 is situated in the vicinity of the edge 22 of the opening 21, along the strut 20*a*. The forward position of the struts allows this forward position of the glazing 10 which can be arranged as close as possible to the front face 40 of the body shell 101.

Thus, the glazed area 10 is moved forward as much as possible to the front of the vehicle 100. This has the effect of clearing the view in this observation direction with respect to a glazing according to the prior art.

Figure 5:
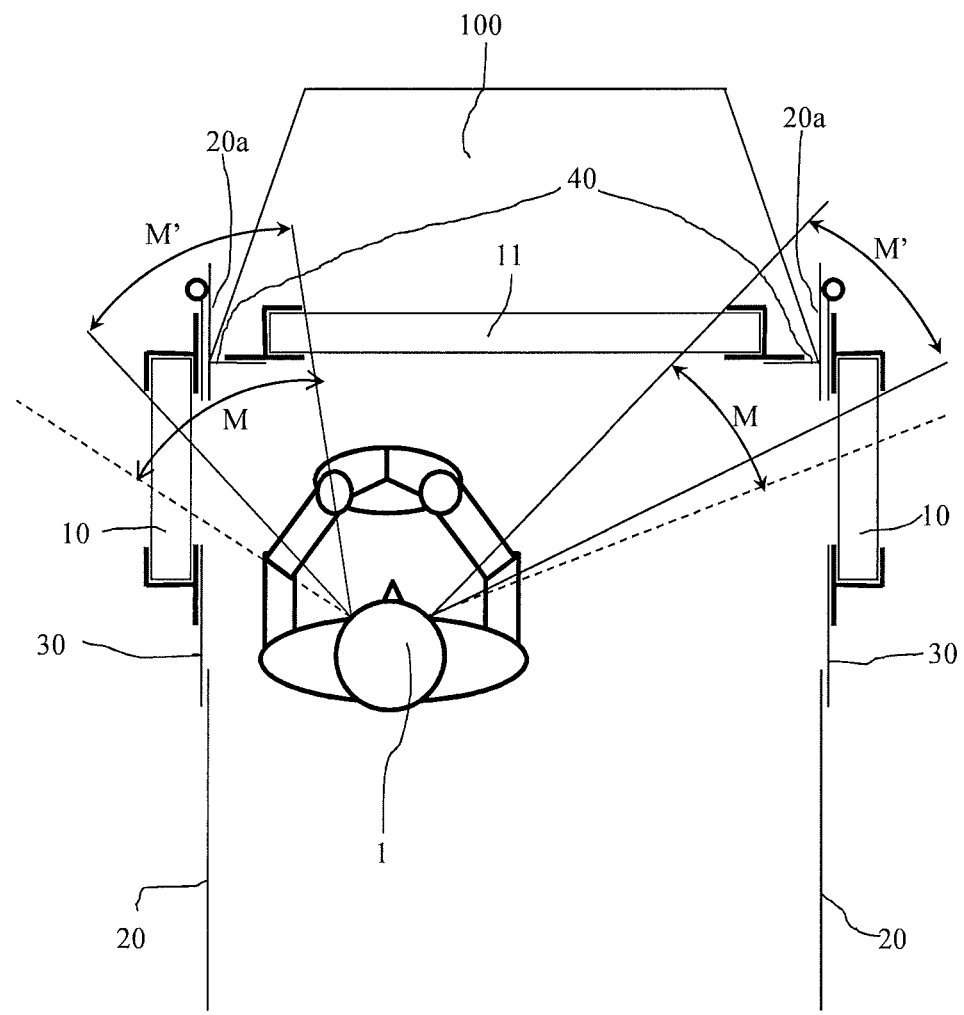
FIG. 5 shows a diagram of a top view of a vehicle according to the invention.

Thus, in FIGS. 4 and 5, it can be verified that a strut 20*a* moved forward allows to move forward the glazing 10, thereby providing a masking angle M' significantly reduced with respect to the masking angle M in the prior art. The left-side masking angle M is reduced by about 7° (namely, more than 25% of reduction of the masking) and the right-side masking angle is reduced by 4.5° (namely, more than 35% of reduction of the masking). Furthermore, as shown in FIG. 4, the strut 20*a* is substantially plane and assembled substantially perpendicularly to the front face 40.

According to the invention, the junction between the strut 20*a* and the front face 40 of the vehicle is made in the vicinity of the rear edge 22 of the strut 20*a*, and not in the vicinity of the front rim 23, namely at a distance from the edge 22 which is lower than 50% of the width of the strut 20*a*. This reduces the cantilever between this rear edge 22 and the front face 40 in comparison with the prior art, such as in FIG. 1 where the front face 40 is made integral with the strut 20*a* at the front rim 23 of the strut 20*a*.

This reduction of the cantilever allows to limit the stresses on the strut due to the blast generated by an explosion on the side of the vehicle.

It is obvious to the person skilled in the art that the invention can be applied to a vehicle which does not comprise a door, but only a lateral glazing. In this case, the strut 20*a* which extends towards the front of the vehicle allows to receive the support surface 9*a* of the frame 9 of the lateral glazing, thereby allowing to move forward the transparent part of the lateral glazing as close as possible to the front face 40 and thus improving the visibility.

It is also obvious to the person skilled in the art that this strut solution according to the invention can be used for other parts of the vehicle body, for example for glazing arranged to the rear of the body. In this case, it will be considered in the previous description that the front face is a rear face of the vehicle.

The invention claimed is:

1. A body shell of an armoured vehicle, the body shell comprising:
    a front face carrying a bulletproof windscreen and projecting towards an outside of the body shell;
    at least one side wall comprising an opening, the side wall being integral with the front face at a strut that is defined by a part of the side wall between an edge of the opening and a rim of the side wall situated furthest outwards at the front of the vehicle, wherein:
        the strut extends beyond the front face towards the outside of the body shell, and
        the edge of the opening is situated near the front face so that a junction between the strut and the front face of the body shell is at a vicinity of the edge of the opening which forms a rear edge of the strut.

2. The armoured vehicle body shell according to claim 1, wherein the opening is configured to be closed by a door comprising a glazing.

3. The armoured vehicle body shell according to claim 2, wherein:
    the door is configured to cover the opening of the side wall, and
    at least one edge of the glazing is situated at the vicinity of the edge of the opening situated near the front face of the body shell.

4. The armoured vehicle body shell according to claim 3, wherein the strut extends towards the outside of the body shell with a width L at least equal to a thickness of the windscreen.

5. The armoured vehicle body shell according to claim 2, wherein the strut extends towards the outside of the body shell with a width L at least equal to a thickness of the windscreen.

6. The armoured vehicle body shell according to claim 1, wherein the strut extends towards the outside of the body shell with a width L at least equal to a thickness of the windscreen.

* * * * *